Dec. 23, 1969        J. W. RABA        3,484,954

ADVANCED DIRECTIONAL ATTACK READING MACHINE

Filed Dec. 22, 1967        2 Sheets-Sheet 1

INVENTOR.
JOSEPH W. RABA
BY
ATTORNEY

Dec. 23, 1969         J. W. RABA         3,484,954
ADVANCED DIRECTIONAL ATTACK READING MACHINE
Filed Dec. 22, 1967                    2 Sheets-Sheet 2

INVENTOR.
JOSEPH W. RABA
BY
ATTORNEY

United States Patent Office 3,484,954
Patented Dec. 23, 1969

3,484,954
ADVANCED DIRECTIONAL ATTACK READING MACHINE
Joseph W. Raba, 30 Peachtree Lane,
Huntington Station, N.Y. 11746
Filed Dec. 22, 1967, Ser. No. 692,903
Int. Cl. G09b *17/00, 17/02*
U.S. Cl. 35—35
6 Claims

ABSTRACT OF THE DISCLOSURE

A moving beam of light is provided, travelling at any desired speed, to enable a pupil to read in natural saccadic manner. A tiltable stand on a base incorporates a variable speed motor driving a shaft. A chamber on the top of the stand has a light source, and a flat plate carrying a series of equally-spaced light beam-moving means is designed to intermittently project a beam of light from left to right through an opening in the wall of the chamber at any desired speed. The reader tilts the chamber until the beam passes over the page being red, and reads the portion illuminated by the beam as it travels from one line to the other.

CROSS REFERENCES TO RELATED APPLICATIONS

In copending application Ser. No. 691,285, filed on Dec. 18, 1967 by Joseph W. Raba, a directional attack reading machine is described for pupils in the intermediate grades (say, the fourth to sixth grades). The present application deals with a machine employable by advanced students, say those in the seventh grade to college levels.

BACKGROUND OF THE INVENTION

This invention deals with controlled reading involving the left-to-right presentation of reading material at predetermined rates, and to providing a way of directly training functional visual skills and directional attack. The illumination of reading material at a timed rate measures and improves the ability to perceive correctly, remember well, and to understand and interpret rapidly and in an organized manner.

In the Raba Patent 3,328,898, a directional attack reading machine is described for use by elementary pupils, say in the first to third grades. The book to be read is mounted on a platform, and an endless strip is passed over the page of the book being read, the strip having stepped opaque and transparent areas of step length and height adequate to cover segmentally each line of the page read.

In copending application Ser. No. 691,285, filed on Dec. 18, 1967 by Joseph W. Raba, a directional attack reading machine is described for pupils of the intermediate grades, say pupils in the fourth to sixth grades. This unit employs an endless tape passing over the open book, the tape having equally spaced alternating transparent and opaque portions, each opaque portion having substantially at least the size of the printed portion on the page being read. This machine has the advantage of uncovering the print in the reading direction, i.e., from left to right, which is the direction in which the reading is naturally done, whereas prior art machines uncover the reading matter vertically, which is an unnatural manner.

There is need for a directional attack machine for advanced pupils. The present invention is directed toward fulfillment of this need.

SUMMARY OF THE INVENTION

According to the present invention, a directional attack reading machine is provided for readers in the advanced grades (say, the seventh grade to college level). It has been found that the eye includes from a part of a word, a few letters, to 2½ words per fixation, and takes about 0.25 second, on the average, to process this visual image. Thus, the reading is done in jerky (saccadic) eye movements from the left to the right of the page.

The present invention provides a moving beam of light which can travel from left to right at any desired speed, thereby enabling the pupil to read in the natural saccadic manner and natural direction at any desired speed. The machine incorporates a tiltable stand on a base incorporating a variable speed motor driving a shaft. A chamber, attached to the top of a stand has a light source and a flat plate carrying a series of equally-spaced light beam moving means designed to intermittently project a beam of light from left to right through an opening in the wall of the chamber at any desired speed. The reader tilts the chamber until the beam passes over the page being read. The reader then reads the portion illuminated by the beam as it travels from one line to the other (raising the book slightly for each line).

The reading speed is set by adjusting the speed of the motor.

BRIEF DESCRIPTION OF THE DRAWINGS

The invention will be more readily understood by reference to the accompanying drawings, in which a preferred embodiment is described, and in which:

FIGURE 3 depicts an elevational side view of an alternative embodiment employing a rotating series of lenses.

The same numerals refer to similar parts in the various figures.

DESCRIPTION OF THE PREFERRED EMBODIMENTS

Figure 1:
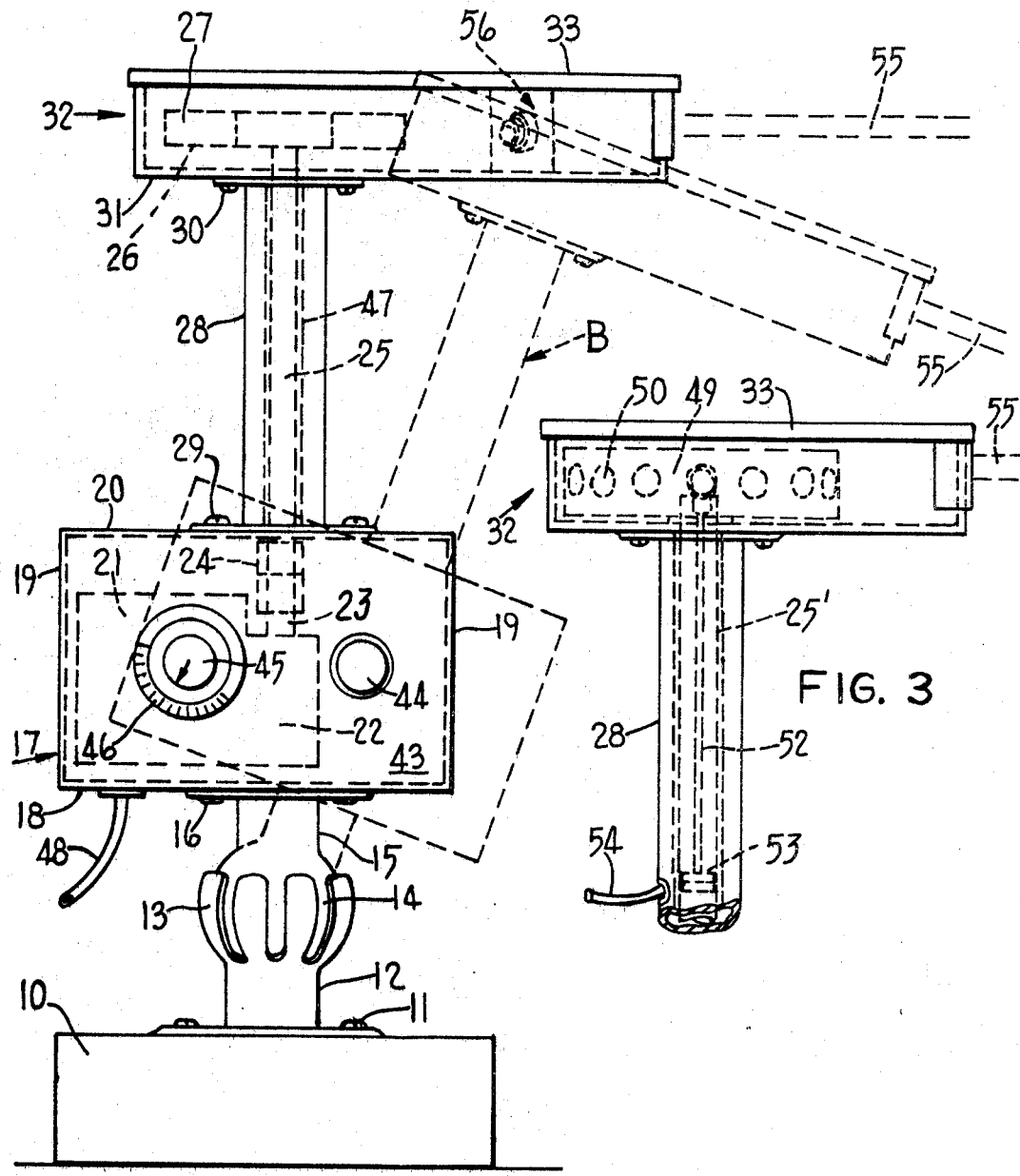
FIGURE 1 illustrates an elevational side view of a preferred directional attack reading machine employing a rotating mirror.
Figure 2:
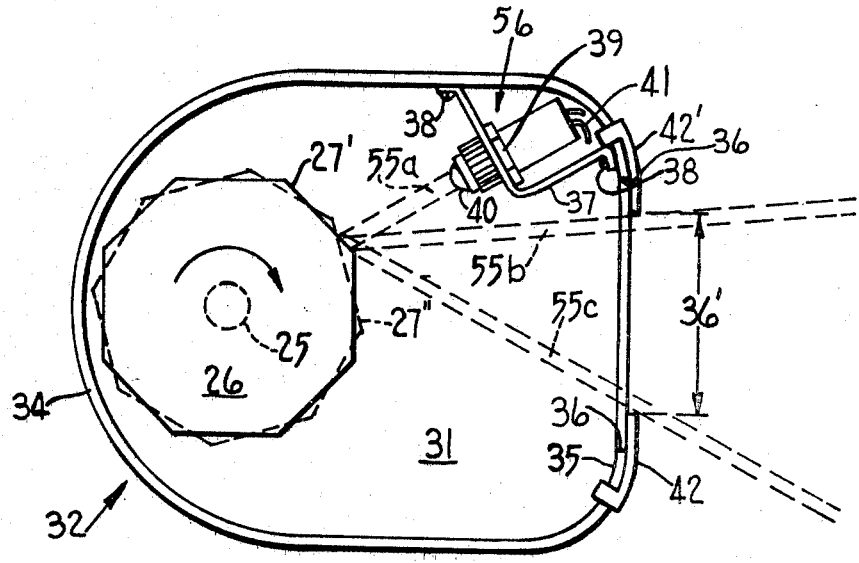
FIGURE 2 shows a top or plan view thereof with cover removed.

Referring to the drawings, and particularly to FIGS. 1 and 2, numeral 10 represents generally a heavy base of metal, stone, or similar material, to the top of which is attached, by screws 11, or otherwise, stand portion 12, the top of which embodies a lower part 13 of a flexible or movable joint, such as a universal joint, knuckle joint, or the like, which may be lockable, if desired. The upper part 14 of the joint is connected to base support 15 which is attached, by means of screws 16, or otherwise, to the bottom 18 of hollow body or housing, indicated generally as 17.

Housing 17, which has walls 19 and top 20, is employed for holding motor 21 and gear train 22, as well as driven shaft 23. Shaft 23 is coupled, by coupling 24, with support rod 25, to the top of which is attached a round flat cylinder or mounting plate 26, the side of which carries a series of flat mirrors 27, 27', 27'', etc., around its periphery. These mirrors have equal lateral dimensions. Although any number of mirrors may be employed, it has been found that eight mirrors provide suitable intermittently-reflective surfaces for the purposes of the invention.

Disposed around rod 25, via channel 47, is optical support 28, which is attached at its bottom, by means of screws 29, or otherwise, to the top 20 of housing 17. Support 28 extends upwardly to a position under cylinder 26, where it is attached, by means of screws 30, or otherwise, to the bottom 31 of optical chamber 32. Chamber 32 has a rounded side 34 which is disposed near plate 26, and a connected straight side or wall 35 disposed farther away from plate 26. Chamber 32 is also preferably provided with a removable cover 33.

In one corner inside chamber 32, near straight side 35, is a mounting, indicated generally as 56, for the lighting system. The latter includes a bracket 37, attached by screws 38, to the inside of sides or walls 34–35. On bracket 37 is mounted a bulb mounting 39, carrying an electric light bulb 40, desirably one with a built-in lens. Wires 41 feed electricity to the bulb, and they may be led to a battery or other source of electricity.

Straight wall 35 is provided with an opening 36 or slit, through which beams of reflected light may be projected. A laterally-slidable shutter 42, 42' is provided on each side of opening 36 to allow for adjustment of the opening to any desired size.

The front panel 43 of housing 17 is provided with an on-off switch 44 for motor 21, as well as a speed control 45, which may be equipped with a dial 46, calibrated for reading speed.

When in use, the unit is placed on a table or stand next to the reader who is desirably placed in a darkened location. Electric cord 48 is plugged into a convenient outlet and bulb 40 is turned on, if a separate electrical source therefor is provided. The reader is comfortably placed for reading the book, or other reading material, and the upper portion of the machine above joint 13–14 is tilted into the desired position B (shown in broken lines in FIG. 1), until the light beam 55 emitted through opening 36 is disposed on the first line to be read. Then, the motor 21 is turned on by switch 44 and the speed of rotation of cylinder 26 is adjusted for the lower speed level.

The light beam 55 then moves from left to right. For example, as the right edge of mirror 27' comes into the field of incidence beam 55a (FIG. 2), reflected beam 55b issues through the left portion of opening 36. As cylinder 26 rotates, mirror 27' also rotates, so that the reflected beam moves rightwardly. When the mirror reaches position 27'', the reflected beam 55c is coming off the left edge of the mirror, whereupon the next mirror comes into the field of incidence, and the reflected ray 55b is back to the left of opening 36.

By placing the page of the book read in the line of moving reflected beam 55b–55c, the reader can read the portion of the line illuminated thereby. As the page is read, the reader gradually raises the book, so that the succeeding left-to-right movements of the beam fall on successive lines of the page. Dial 45 is turned to increase or reduce the rotational speed of cyclinder 26.

It has been found that when eight mirrors are employed around plate 26, they need be only about ⅛" to about ¼" in width and about ½" to about 1" in length.

Figure 4:
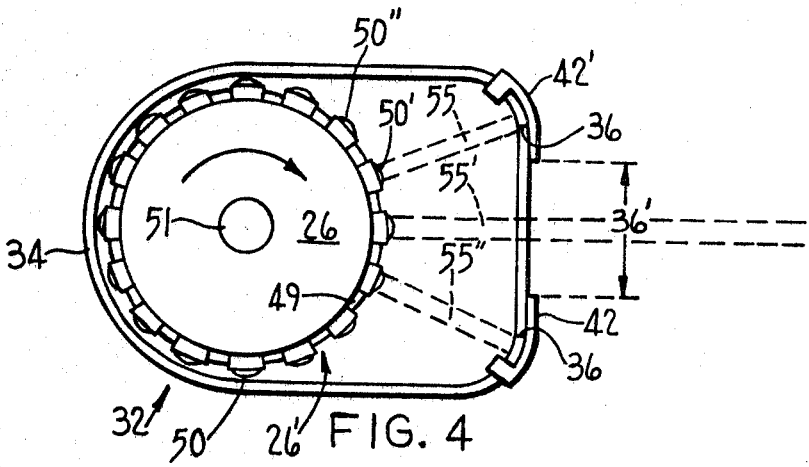
FIGURE 4 presents a top or plan view of the unit of FIGURE 3, with cover removed.

The modification in FIGS. 3–4, involves use of a rotatable hollow flat cylinder 26' mounted on plate 26, which is centrally attached to hollow rod 25'.

Otherwise, the unit is mounted as in FIG. 1. The wall 49 of cylinder 26' is provided with a series of equally-spaced lenses 50, 50', 50'', etc. An electric bulb 51 is centrally disposed in cylinder 26', on mounting plate and its electrical leads 52 pass through hollow rod 25' and to conventional sliding contacts 53, from which electric leads 54 are led out through support 28, to be connected to an electrical source for illumination of bulb 51.

When light 51 is turned on, beams of light issue through lens 50, 50', etc. The lens are spaced so that, desirably, only one beam will cross the page at one time, so as to avoid confusion which would be caused by the appearance of more than one beam of light on the page being read. This is effected also by the aid of the slides 42–42' which control the size of opening 36', through which the visible beam emerges. For example, as light beam 55, issuing from lens 50', reaches the left edge of opening 36', it crosses the opening from left to right as beam 55', after which, when it reaches the right edge of opening 36', it disappears as beam 55'', and a new beam appears in the opening from lens 50''. The use of the machine is the same as described for FIGS. 1–2.

The beam of light projected by the machine need be only about ⅛" to about ¼" diameter.

I claim:
1. A directional attack reading machine, of the type described, comprising:
   a base,
   a stand mounted on said base in tiltable relation thereto,
   a housing incorporated in said stand and containing a variable-speed motor connected to a driven shaft,
   a hollow chamber mounted on the top of said stand, said chamber having a bottom and a side wall, including means forming an opening at one end of said wall,
   a rod passing through the bottom of said chamber at the other end thereof, and connectable to said motor shaft,
   a mounting plate centrally mounted on said rod within said chamber,
   a series of equally spaced light beam-moving means mounted on the periphery of said plate, and
   a light source mounted in said chamber in a manner such that, as the light impinges upon the light beam-moving means, while said shaft and rod are rotated by said motor, a beam of light is moved by each moving means in reading direction across said wall opening.

2. A directional attack reading machine, according to claim 1, in which said light source is mounted near said wall opening, and
   said series of light beam-moving means comprises a series of mirrors of equal length mounted on the periphery of said plate in axial relation to said rod.

3. A directional attack reading machine, according to claim 1, in which shutter means are provided at said opening for control of the size thereof.

4. A directional attack reading machine, according to claim 1, in which said stand has a movable joint for tilting said chamber.

5. A directional attack reading machine, according to claim 1, in which said light source is located on said plate, and a series of lens of equal size is mounted around said plate, serving as light beam-moving means.

6. A directional attack reading machine, according to claim 5, in which said plate has a cylindrical wall mounted at its periphery and extending upwardly, and said lens are mounted in said cylindrical wall.

References Cited

UNITED STATES PATENTS 2,745,313  5/1956  Taylor.
2,782,528  2/1957  Wastl.
2,865,114  12/1958  Pearce.
2,252,726  8/1941  Peck.

EUGENE R. CAPOZIO, Primary Examiner
WILLIAM H. GRIEB, Assistant Examiner

U.S. Cl. X.R.
240—41.1; 351—31